(12) United States Patent
Hendricus (10) Patent No.: US 9,655,343 B2
(45) Date of Patent: May 23, 2017

(54) UNMANNED FEED WAGON (71) Applicant: Trioliet Holding B.V., Oldenzaal (NL)

(72) Inventor: Liet Cornelis Hendricus, Losser (NL)

(73) Assignee: Trioliet Holding B.V., Oldenzaal (NL)

( * ) Notice: Subject to any disclaimer, the term of this patent is extended or adjusted under 35 U.S.C. 154(b) by 637 days.

(21) Appl. No.: 14/184,176

(22) Filed: Feb. 19, 2014

(65) Prior Publication Data

US 2014/0230737 A1 Aug. 21, 2014

(30) Foreign Application Priority Data

Feb. 20, 2013 (DE) .................... 20 2013 001 659 U (51) Int. Cl.
*A01K 5/02* (2006.01)
*A01K 5/00* (2006.01)

(52) U.S. Cl.
CPC ............ *A01K 5/0266* (2013.01); *A01K 5/004* (2013.01)

(58) Field of Classification Search
CPC .................................................. A01K 5/0266
USPC ....................................... 119/57.92
See application file for complete search history.

(56) References Cited

U.S. PATENT DOCUMENTS

| | | | |
|---|---|---|---|
| 2,022,186 A | 11/1935 | Butler | |
| 2,742,099 A | 4/1956 | Hagen | |
| 3,009,525 A * | 11/1961 | De Liban | G05D 1/0265 114/23 |
| 3,204,607 A | 9/1965 | Arnold | |
| 4,607,575 A * | 8/1986 | Bryda | B62D 1/26 104/295 |
| 4,733,740 A * | 3/1988 | Bigowsky | B62D 1/28 104/295 |
| 5,007,496 A | 4/1991 | Whitten et al. | |
| 5,069,165 A | 12/1991 | Rousseau | |
| 5,816,192 A * | 10/1998 | van der Lely | A01K 5/00 119/57.92 |
| 8,577,530 B2 | 11/2013 | Ruth et al. | |
| 8,627,784 B2 | 1/2014 | Esch et al. | |
| 9,022,153 B2 | 5/2015 | Tojima et al. | |
| 9,238,411 B2 | 1/2016 | Dronnik et al. | |
| 2006/0108872 A1* | 5/2006 | Marra | B60L 5/00 307/10.1 |
| 2007/0227455 A1 | 10/2007 | Samiya | |

(Continued)

FOREIGN PATENT DOCUMENTS

| | | |
|---|---|---|
| DE | 2324219 A1 | 12/1974 |
| DE | 3821098 A1 | 12/1989 |
| DE | 4341022 A1 | 6/1994 |

(Continued)

OTHER PUBLICATIONS

IBM Technical disclosure bulletin, Jan. 1, 1971, vol. 13, Issue No. 8, pp. 2200-2201.*

(Continued)

*Primary Examiner* — Fritz M Fleming
(74) *Attorney, Agent, or Firm* — Fish & Richardson P.C.

(57) ABSTRACT

An unmanned feed wagon including a ground-supported chassis, an electric drive for driving the chassis along a predetermined path of movement and a power supply for the electric drive, wherein the power supply includes a power rail following the predetermined path of movement and having a sliding contact which is connected to the electric drive.

25 Claims, 12 Drawing Sheets

(56) References Cited

U.S. PATENT DOCUMENTS

2010/0326363 A1* 12/2010 Van Den Berg ....... A01K 1/105
119/57.92

FOREIGN PATENT DOCUMENTS

| | | |
|---|---|---|
| DE | 202012007207 U1 | 10/2013 |
| EP | 0168599 A1 | 1/1986 |
| EP | 0739161 A1 | 10/1996 |
| EP | 2124528 A1 | 12/2009 |
| GB | 2464472 B | 11/2010 |
| GB | 2479061 B | 2/2012 |
| NL | 6707862 A | 12/1968 |
| WO | WO 96/14735 A1 | 5/1996 |
| WO | WO 2008/118004 A1 | 10/2008 |
| WO | 2011023860 A2 | 3/2011 |

OTHER PUBLICATIONS

German Search Report dated Jan. 20, 2014 which issued in German Application No. 20 2013 001 659.0.
European Search Report which issued on Jul. 8, 2014 in corresponding European Patent Application No. 14154806.5.
European Search Report which issued on Apr. 8, 2014 in corresponding European Patent Application No. 14154806.5.
Voluntary Prior Art Submission by third party dated Jun. 17, 2016 submitted in corresponding Canadian Application No. 2843302.
Voluntary Prior Art Submission by third party dated Jun. 28, 2016 submitted in corresponding Canadian Application No. 2843302.
Dairy Cow Comfort Tie-stall Dimensions article, published on-line by the Ontario Ministry of Agriculture, Food and Rural Affairs, 14 pages, retrieved Aug. 18, 2016.

* cited by examiner

UNMANNED FEED WAGON

OBJECT OF THE INVENTION

The invention relates to an unmanned feed wagon, which is used e.g. as a feeding robot for feeding animals in a stable and which, to this end, must be movable in the stable lane from and to the loading facilities, such as a silo or the like.

DESCRIPTION OF THE INVENTION

Such a feed wagon with a ground-supported chassis is known e.g. from EP 0 739 161. For providing power for the electric drive of this feed wagon, the feed wagon is equipped with an on-board battery. Batteries are, however, comparatively heavy so that a certain compromise between the time available up to the next charging operation and the weight of the battery must be made. In particular in large agricultural farms the limited range of the battery may be problematic. Moreover, batteries do not have an unlimited service life, the mean service life to be reckoned with being approximately 3 years. Furthermore, the capacity decreases abruptly when the battery is operated at low temperatures, e.g. outdoors in winter (at −20° C.). The known feeding robot is therefore configured such that a power rail is installed in the stable lane, and the feeding robot can charge its battery on said power rail while dispensing fodder in the stable lane. The sliding contact is, however, connected to the battery; therefore, the drawbacks of the battery have to be put up with nevertheless.

A further problem of unmanned feed wagons with a ground-supported chassis is feed wagon navigation, which must be configured robustly and operate safely and reliably. In the case of the feed wagon according to EP 0 739 161 route markings are defined along the path of movement, which the feed wagon is intended to cover automatically and without being driven by an operator, and on the occasion of a manned trip of the feed wagon along the path of movement these route markings are stored. Route markings may, however, change and they are comparatively difficult to define, in particular during a trip in the open country which may perhaps become necessary.

In addition, it is already known from U.S. Pat. No. 5,069,165 to configure an unmanned feed wagon as a suspended system and to make it move along a rail suspended from the ceiling. According to this embodiment it is already known to realize the power supply of the feed wagon via a power rail and a sliding contact. However, overhead guide tracks for feed wagons whose operating weight, including the load, may easily be as high as approximately 1,500 to 2,000 kg necessitate an extremely stable support structure and an extremely stable roof for suspension, which are not available everywhere.

Also NL-A-1033907 describes an unmanned feed wagon driven via a battery or an internal combustion engine. Internal combustion engines are, however, not very desirable for use in a stable because of the emissions and the risk that hay and straw may catch fire.

Finally, EP-A-2 124 528 and NL-A-1033907 disclose navigation systems for feeding robots with which said feeding robots can automatically move in space freely and in a target-oriented manner.

Finally, NL-A-7901058 discloses a feeding robot which, with the aid of sensing devices operating in a contact-free manner, holds a feed wagon always precisely centrally to a suspended guide rail.

It is the object of the present invention to provide an unmanned feed wagon, which is supplied with operating power in a structurally simple manner and/or conducted along a predetermined path of movement in a structurally simple manner.

This object is achieved with the features of the present invention.

By means of the power supply provided according to the present invention, also a ground-supported chassis can be supplied with operating power easily and without any interruptions for charging a possible battery. The technique of tapping the power via a sliding contact from a power rail is robust, proven and tested and adapted to ground-supported chassis in accordance with the present invention.

The steering mechanism according to the present invention that makes use of a steering rail and a sensing device for sensing the predetermined path of movement is also structurally simple and robust in operation and adapted to the ground-supported chassis according to the present invention.

Preferably, the steering rail and the power rail may be arranged on a common carrier, whereby the structural design will be simplified still further. When the power rail and/or the steering rail are arranged above the chassis, they are located outside the working area in the stable lane or in the silo or the like, so that they will not disturb the flow of work.

Preferably, the path of movement is sensed mechanically from the steering rail, in particular by constant contact between a sensing head and the steering rail.

If the sensing head is connected to the chassis via a pivotable steering arm, this will allow compensating movements and evasive movements of the chassis on the one hand; on the other hand, it will be possible to realize, in spite of rigid steering rails, various operating and movement positions of the feed wagon, e.g. cornering or the so-called "crab-steering mode", in the case of which the longitudinal centre line of the feed wagon extends at an angle relative to the path of movement.

According to one variant, a simple spiral spring, which guarantees length compensation so to speak automatically, may be provided instead of a steering arm. A pull switch, which switches if the spring should be excessively extended, may be integrated in the spring or provided parallel thereto.

Preferably, the sliding contact is arranged on a carriage which follows the power rail, also the sensing head being arranged on this carriage according to an expedient embodiment.

Advantageous further developments of the invention are disclosed in the additional sub-claims.

BRIEF DESCRIPTION OF THE DRAWINGS

Embodiments of the present invention will be explained in more detail making reference to the drawings, in which.

DETAILED DESCRIPTION OF THE DRAWINGS

Figure 1:
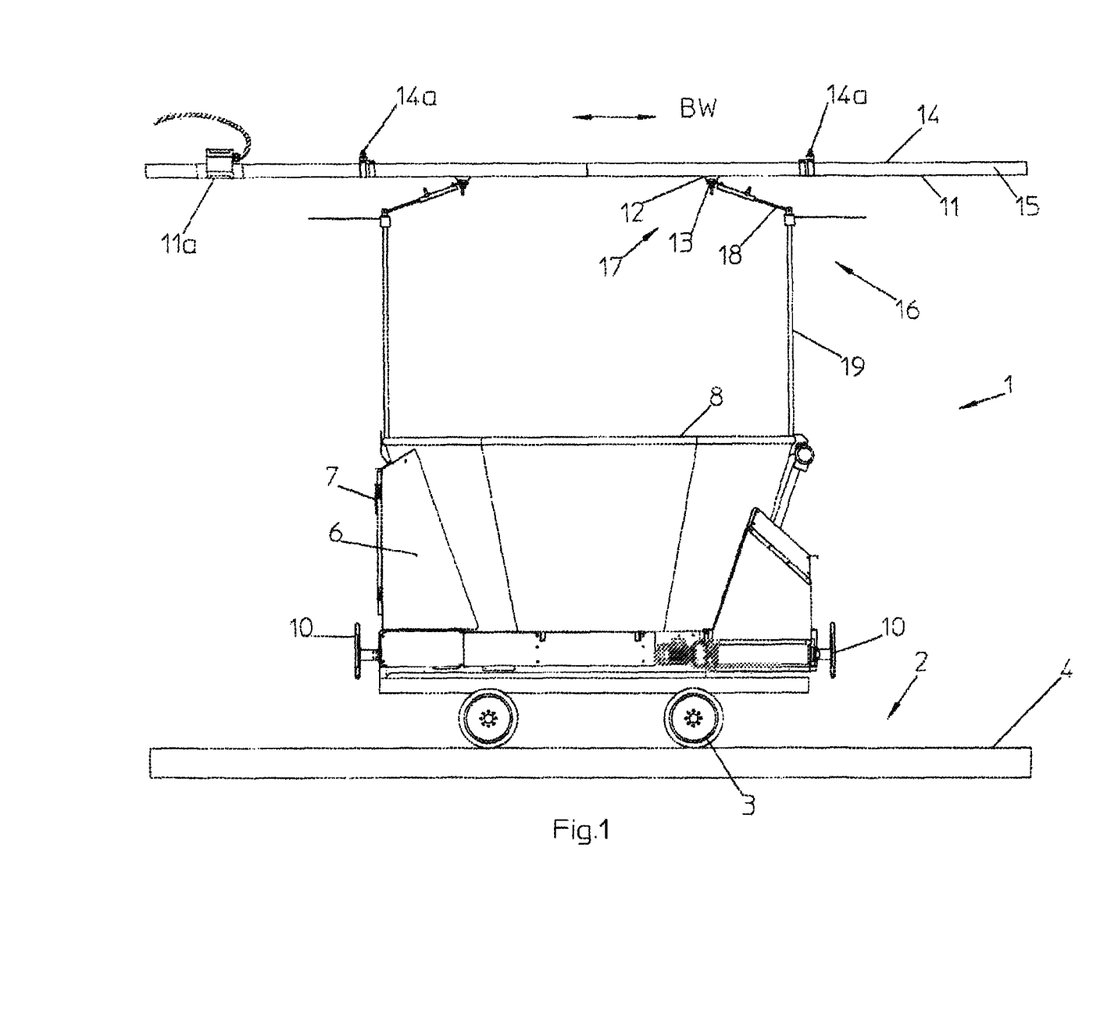
FIG. 1 shows a schematic side view of an embodiment of a feed wagon according to the present invention.
Figure 2:
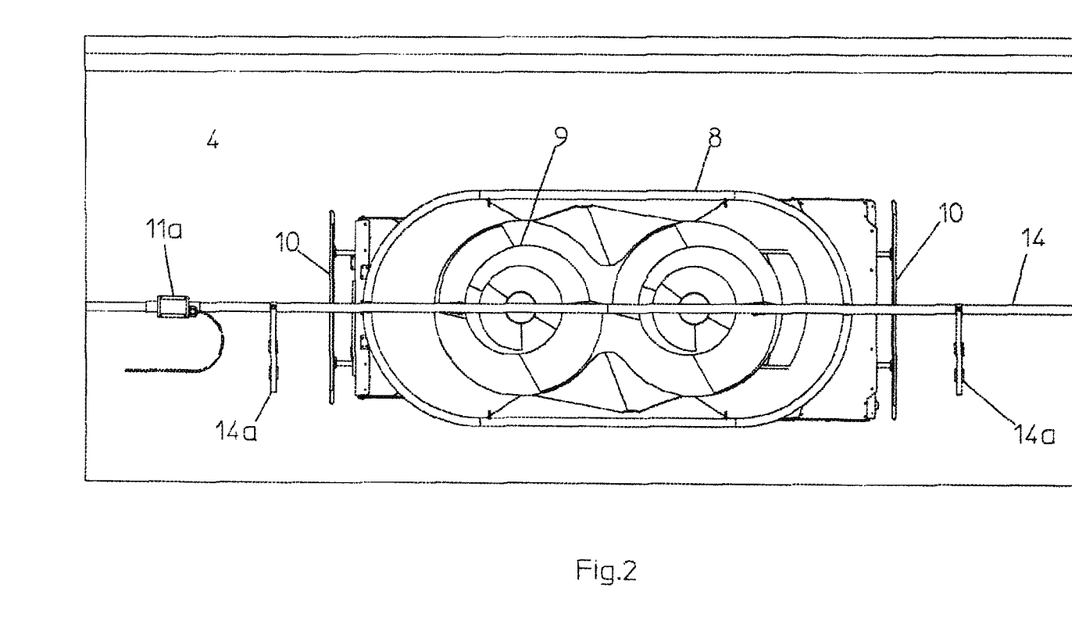
FIG. 2 shows the top view of the feed wagon according to FIG. 1.
Figure 3:
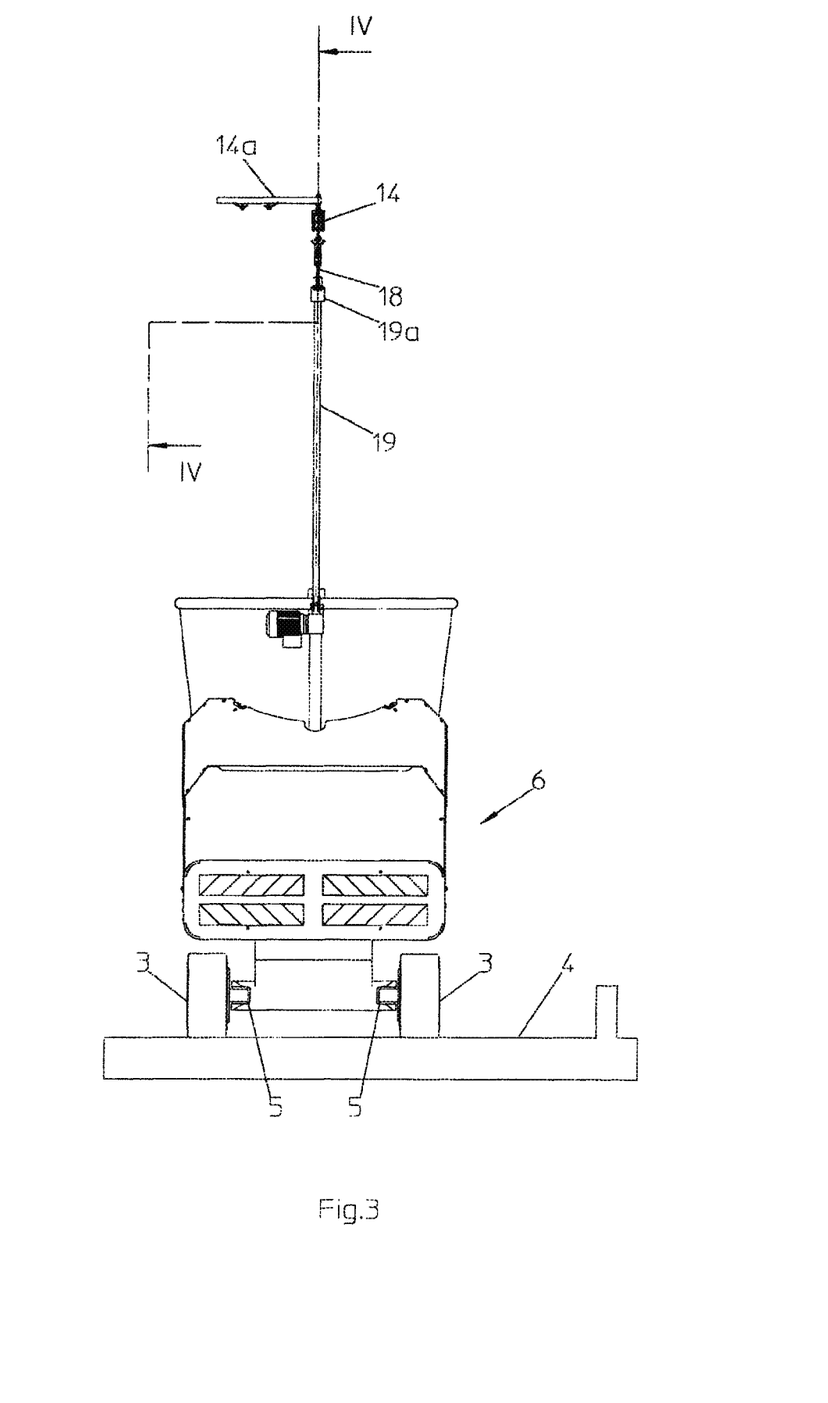
FIG. 3 shows the front view of the feed wagon according to FIG. 1.

FIGS. 1 to 3 show in various views a first embodiment of an unmanned feed wagon 1 according to the present invention, which, except for the details described hereinbelow, is configured like a conventional feed wagon. The feed wagon 1 includes a ground-supported chassis 2 comprising here four steered wheels 3, which are arranged in pairs opposite one another and in succession to one another and which are capable of rolling on an underlying surface 4, e.g. in the stable lane or in the area of the silo. The feed wagon 1 is driven via an electric drive 5. In the embodiment shown, each of the four wheels 3 is adapted to be driven by individual drives in the form of wheel motors individually and independently of the respective other wheels (FIG. 3). The wheel motors are connected to a signal-processing and control unit 6, which is operable by a computer that is not shown. The computer is preferably located outside the feed wagon and is connected thereto by a cable or in a cable-free manner. The feed wagon 1 may additionally have provided thereon a control panel 7. Via the control unit 6 the driving speed and/or the number of revolutions of individual wheels 3 can be controlled in a programmable manner.

The feed wagon 1 additionally comprises the conventional container 8, which has here an elongated oval shape and which normally accommodates a mixing device 9 that is here not shown or only shown in outlines. In addition, safety means such as bumpers 10 with an emergency shutdown may be provided.

The electric drive 5 of the feed wagon 1 is supplied with operating power with the aid of a power rail 11, which is provided with a power junction box 11a, and a sliding contact device 12. The sliding contact 12 is arranged on a carriage 13, which, in a manner that will have to be described hereinbelow, is moved by the feed wagon 1 along the power rail 11 on a predetermined path of movement BW. An electric connection line extends from the sliding contact device 12 directly to the electric drive 5, i.e. the electric drive 5 has electric power directly supplied thereto from the sliding contact 12 via an electric cable 11b.

The power rail 11 is fixed to a carrier 14 imparting the necessary mechanical strength thereto and extending along the predetermined path of movement BW. The carrier 14 is arranged above the feed wagon 1 and its chassis 2, and, e.g. by means of a suspension 14a, it is secured in position either on the ceiling or at other suitable locations, e.g. pillars, such that it will follow the predetermined path of movement BW. Since the feed wagon 1 is ground-supported, the weight that has to be carried by the carrier 14 is essentially only its own weight, so that the static demands on the strength of the anchoring points are low.

The carrier 14 additionally comprises a steering surface 15, which also extends along the predetermined path of movement BW. The steering surface 15 serves to guide a steering mechanism 16 for the feed wagon 1. The steering mechanism 16 comprises a sensing device 17 with a sensing head, which is in direct contact with the steering rail 15, thus sensing the contour of the predetermined path of movement BW on the steering rail 15. The carriage 13 rests via supporting wheels 13a on a profile of the carrier 14 such that at least one of the supporting wheels 13a or a separate guide wheel (not shown) is in permanent contact with the steering surface 15. At the same time, forces are taken up in all directions.

According to the preferred embodiment, the carriage 13 carrying the sliding contact 12 is also configured as a sensing head.

The sensing device 17 additionally includes a steering arm 18 that is pivotably articulated on the sensing head on the carriage 13 as well as on a support rod 19, which is fixedly connected to the chassis 2, if necessary via intermediate components, and which is capable of transmitting all the movements of the chassis 2 to the steering arm 18. The articulation points 18a, 18b of the steering arm 18 on the carriage 13 on the one hand and the support rod 19 on the other are spaced apart vertically as well as horizontally, when the wheels 3 rest on the ground 4. In addition, the articulation points are configured such that they allow a pivotal movement of the steering arm 18 in a vertical as well as in a horizontal plane and in all the intermediate planes, at least through the angular ranges in which such a relative movement can actually occur during operation.

Figure 4:
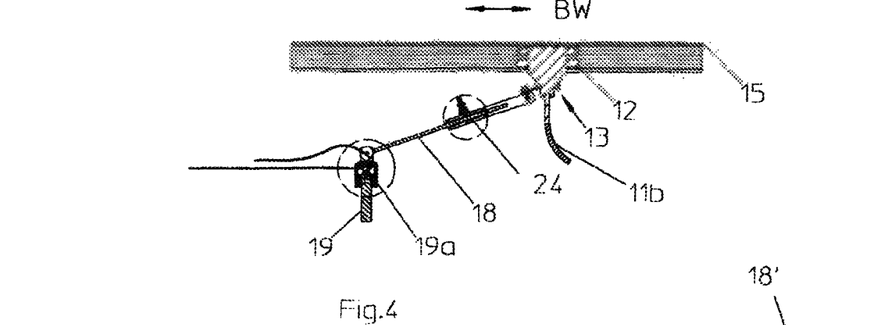
FIG. 4 shows an enlarged representation of the steering mechanism of a feed wagon according to the present invention.
Figure 5:
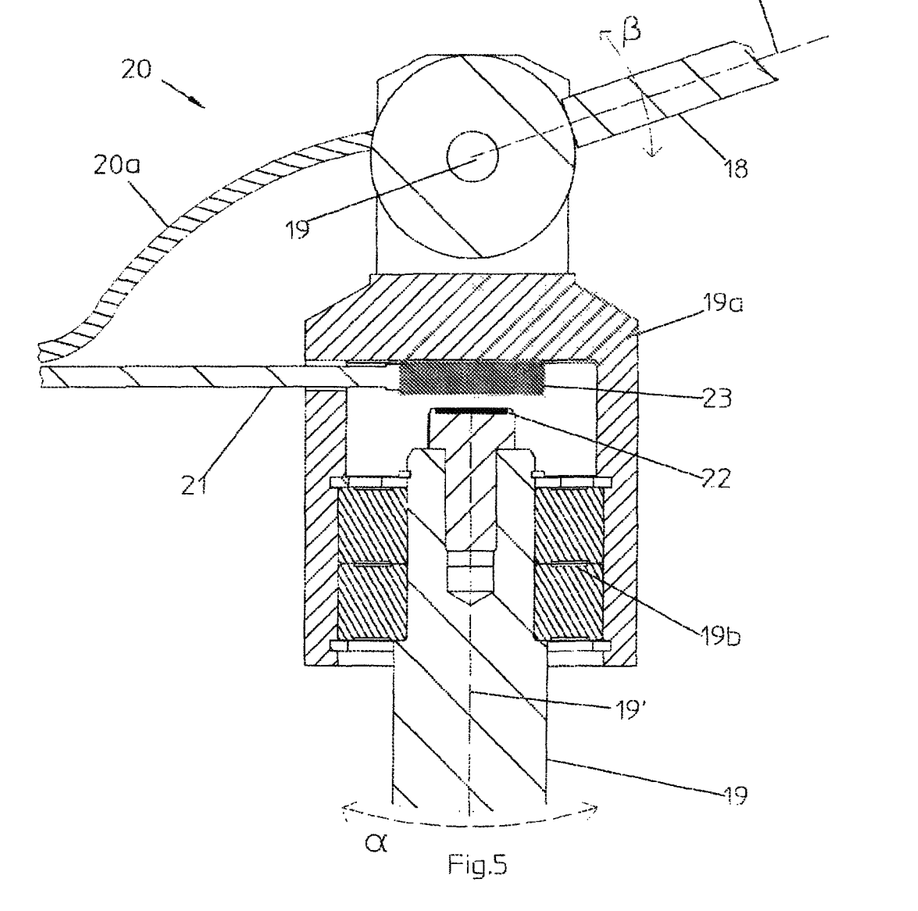
FIG. 5 shows an enlarged sectional view of the sensor unit.
Figure 6:
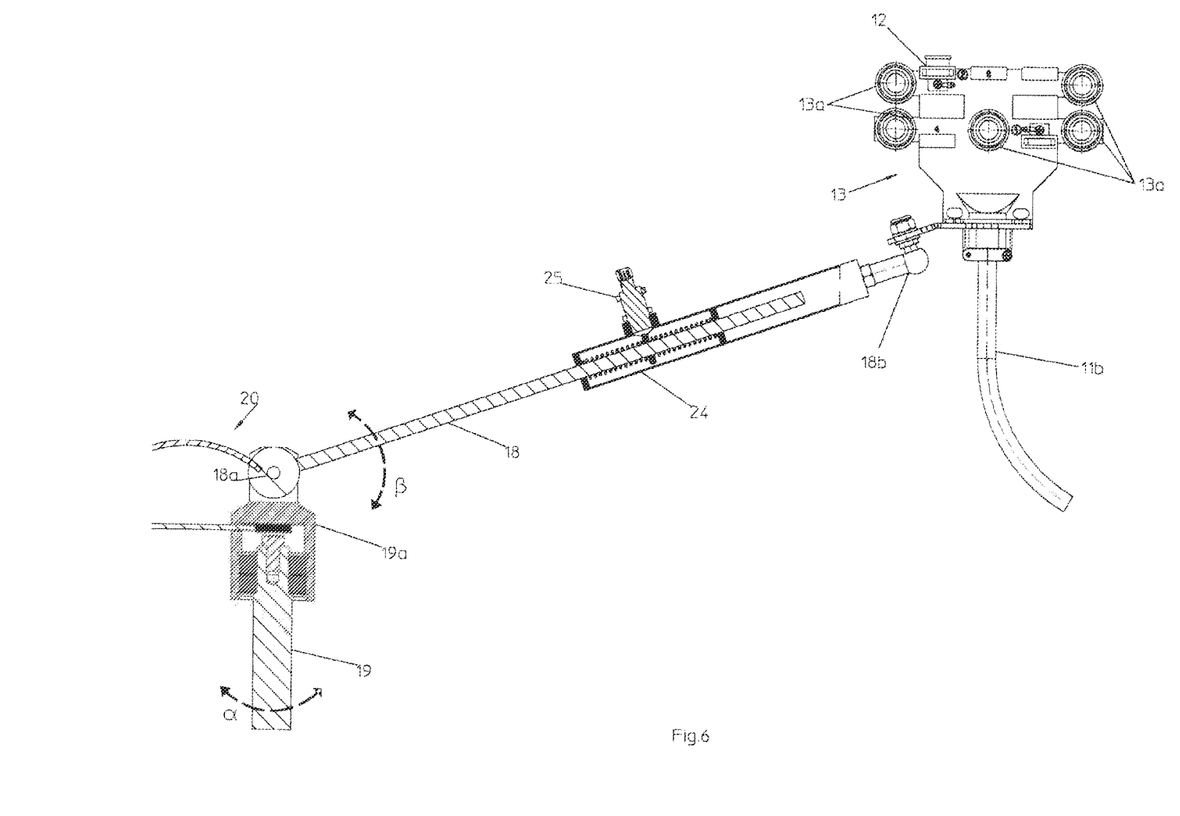
FIG. 6 shows an enlarged representation of the steering arm.

The relative movements between the steering arm 18 and the support rod 19 are monitored by a sensor unit 20 (FIGS. 4 to 6). The sensor unit 20 comprises sensors, which preferably operate in a contact-free manner, so as to determine an angle of rotation α of the steering arm 18 about the longitudinal center line 19' of the support rod 19 as well as a vertical pivoting angle β between the longitudinal center lines 18', 19' of the steering arm 18 and the support rod 19. The determination of the pivoting angle β (angle of inclination) takes place in the area of an articulation point 18a of the steering arm 18 on a rotary sleeve 19a, which, via a bearing 19b, is placed on the upper end face of the support rod 19 such that it is rotatable thereon but secured against axial displacement relative thereto. The determination of the pivoting angle β is preferably carried out for reasons of safety and causes emergency shutdown, if the chassis 2 should e.g. collide with an obstacle, which means that the feed wagon 1 will be raised, or tilt over an edge, which means that the feed wagon 1 will be lowered. Determining and monitoring this pivoting angle is, however, also expedient, if the predetermined path of movement should comprise upward and/or downward slopes. Any suitable sensor, e.g. a magnet-based sensor or the like, may be used as an angle sensor for the pivoting angle β. The control unit 6 connected by means of a signaling and feed line 20a defines a tolerance range for the angle β, which is tolerable with respect to uneven terrain that can easily be coped with by the feed wagon or with respect to variations in the steering behavior and which does e.g. not necessitate any intervention on the part of the control unit, let alone an emergency shutdown. In addition, the determination of the pivoting angle β will support downward and upward trips.

The angle of rotation α defines the actual steering behavior, i.e. the horizontal distance between the projection of the steering rail 15 and the chassis 2 related to the position of the two articulation points 18a, 18b of the steering arm 18 on the rotary sleeve 19a and the carriage 13, respectively, transversely to the path of movement BW. The angle of rotation α is monitored by a suitable sensor 21, e.g. a magnetic sensor, defined by a magnet 22, which is fixedly connected to the support rod 19, and a sensor 23, which is fixedly connected to the rotary sleeve 19a. The signals from the sensor 21 are transmitted to the control unit 6 and/or the computer by the signaling line 20a or by wireless transmission. The angle of rotation α defines the angle between the steering arm 18 and the path of movement BW.

Angles of rotation, which correspond to different operating states and which have to be kept constant during these operating states for retaining the feed wagon 1 on the predetermined path of movement, are stored in the control unit or in the computer. These operating states are defined e.g. by manual test runs, in which the data created during this "learning trip" are stored with a suitable software routine and copied in the case of each unmanned trip.

The steering arm 18 includes, as a further safety feature, a length compensation system 24, which, on the one hand, limits the forces to be taken up by the steering arm 18 and prevents the latter thus from being damaged when the feed wagon 1 moves beyond the admissible areas of steering and which, on the other hand, ensures a sufficient amount of time for a corrective intervention on the part of the control so as to initiate an intentional steering action or safety action. Also the length compensation system 24 is equipped with emergency shutdown means 25. To this end, the steering arm 18, which is spring-loaded by a spring 24a, is telescopically variable in length, the contact of the switch 25 being interrupted if the variation in length exceeds an acceptable degree. This result may also be accomplished by a variant according to which the steering arm in its entirety is replaced by a spiral spring with an integrated pull switch. This kind of spring allows more flexibility and realizes length compensation automatically.

For operating the feed wagon 1, the angle of rotation α, in particular a tolerance range of the angle of rotation α, and possibly also the pivoting angle β or a tolerance range of the pivoting angle β are specified, which angles must be kept constant, when the feed wagon 1 is on the predetermined path of movement. If one of the angles, determined by the sensor unit 20, deviates in an unacceptable manner from the angle of rotation α or the pivoting angle β, the control will initiate a corrective steering movement in the chassis 2, e.g. by a defined steering movement of the steered wheel or wheels 3 or by changing the number of revolutions of individual wheels or by other measures. This allows the feed wagon 1 to be retained on the predetermined path of movement in a structurally simple and reliable manner.

Figure 7:
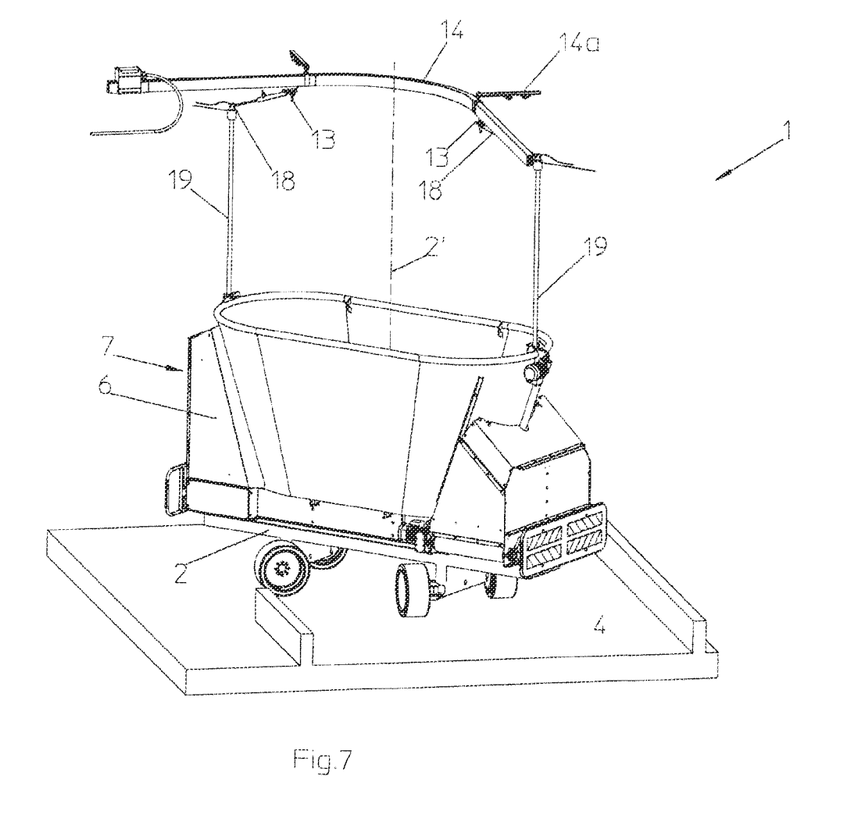
FIG. 7 shows the feed wagon according to FIG. 1 during cornering.

In order to facilitate cornering, the steering arms 18 should expediently be arranged such that the carriage 13 is positioned as close as possible to the vertical center line 2' of the chassis 2. In the case of the elongate chassis shown in FIG. 1 and FIG. 7, it will additionally be expedient to provide two support rods 19, two steering arms 18 and two carriages 13, which are located in the vertical center plane and arranged laterally reversed relative to the center line 2' such that the carriages 13 are directed inwards towards the center line 2'. In this way, cornering will easily be possible with two steered pairs of wheels, as can be seen in FIG. 7. Care should be taken that the vertical center line 2' is located close to the carrier 14 or extends therethrough. In addition, the steering arm 18 should be positioned such that it extends parallel to the wheel position, i.e. indicates the steering angle of the wheels 3.

Figure 8:
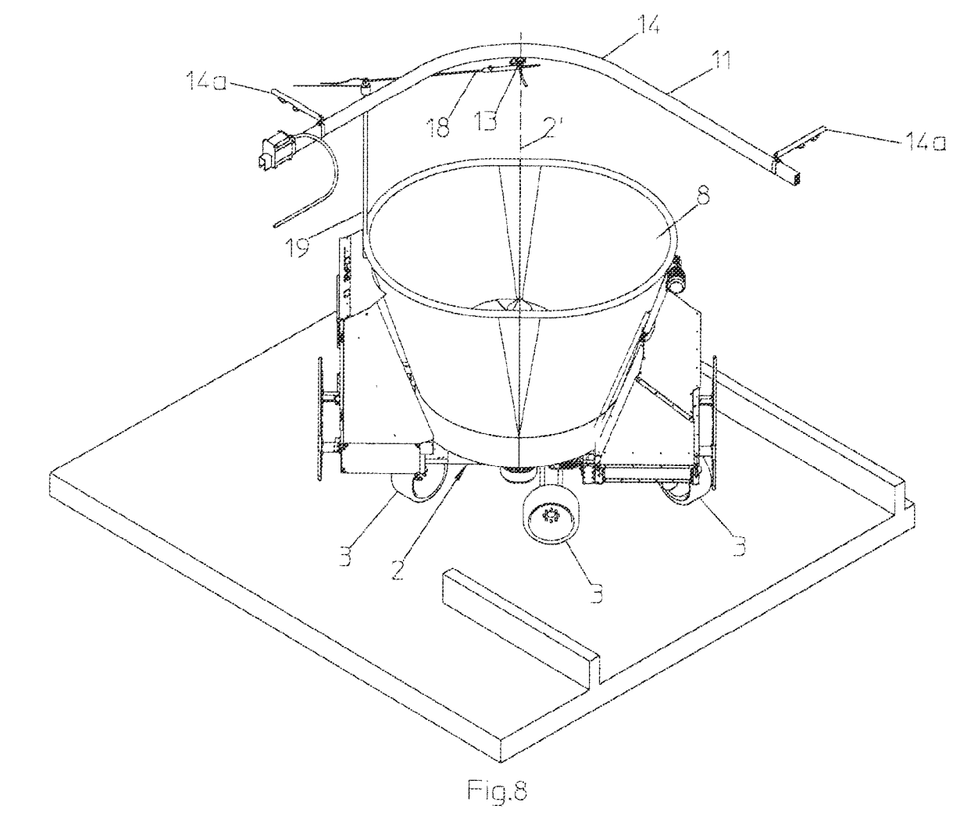
FIG. 8 shows a further embodiment of a feed wagon according to the present invention during cornering.

In the case of comparatively small containers 8, for which a single support rod 19 and a single steering arm 18 as well as a single carriage 13 will suffice, the carriage 13 should again be kept as close as possible to the vertical center line 2' of the chassis 2. In FIG. 8 this is accomplished by a chassis with four individually steerable wheels 3, which are arranged crosswise at equal distances from one another.

Figure 9:
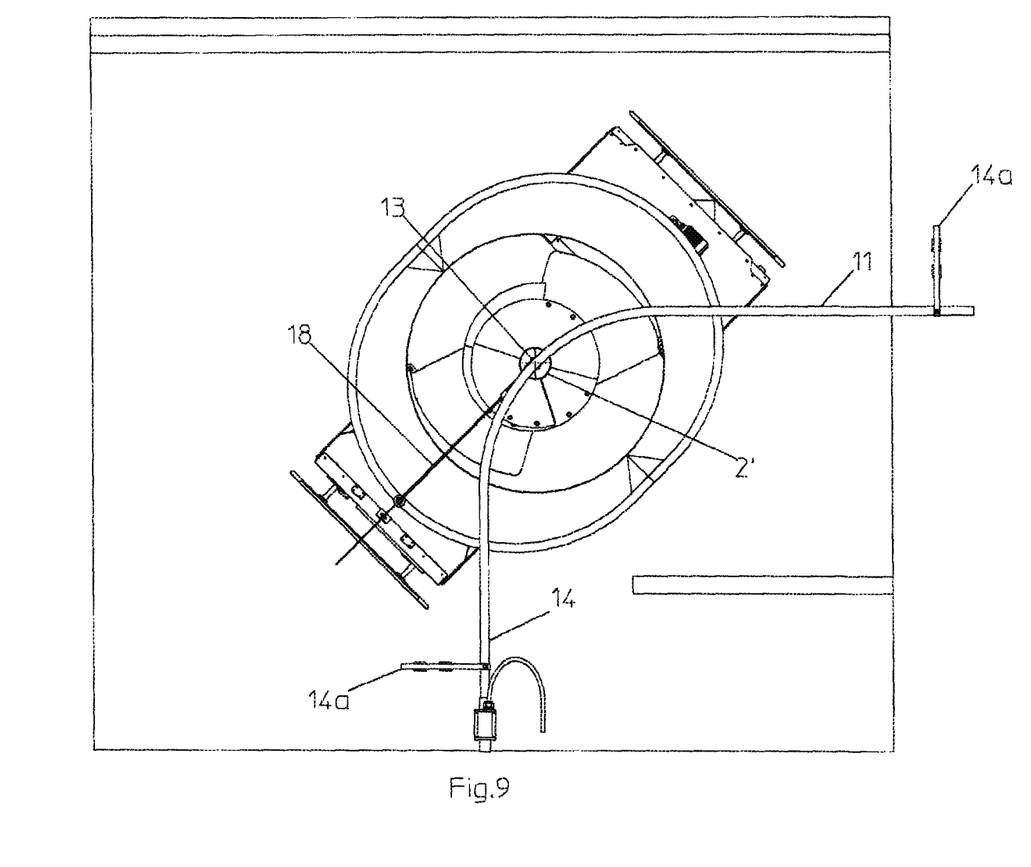
FIG. 9 shows the feed wagon according to FIG. 8 in a top view.

FIG. 9 illustrates the arrangement of the carriage 13 on the vertical center line 2', whereby extremely precise cornering is allowed.

Figure 10:
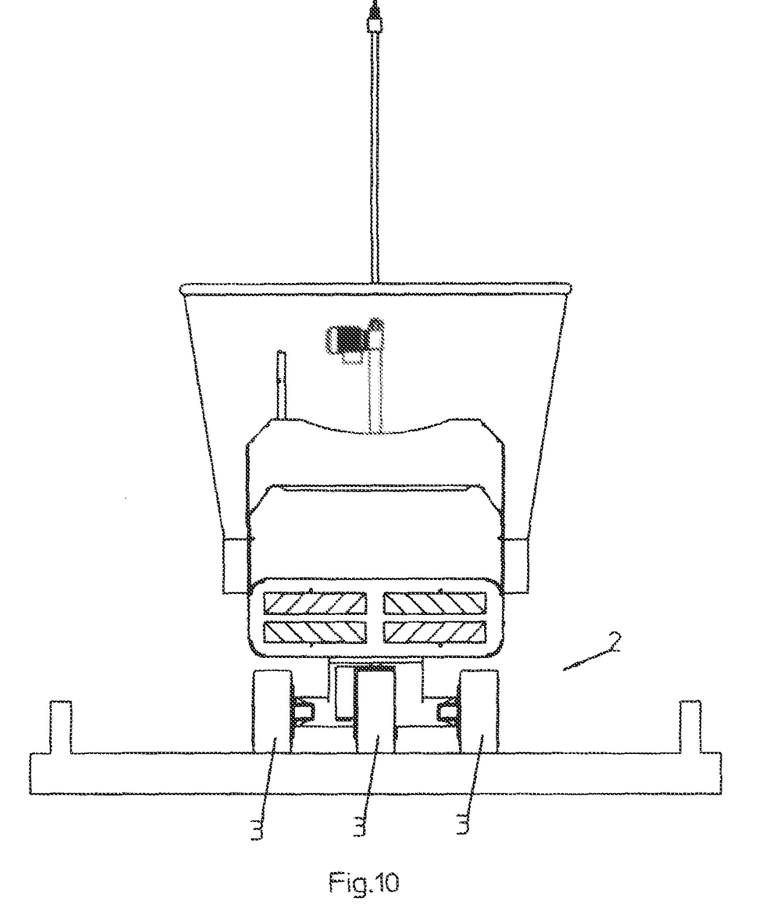
FIG. 10 shows the feed wagon according to FIG. 8 in a front view.

FIG. 10 shows the feed wagon according to FIGS. 8 and 9 moving straight ahead, the chassis 2 being provided with laterally opposed wheels 3 and two central leading and trailing wheels 3.

Figure 11:
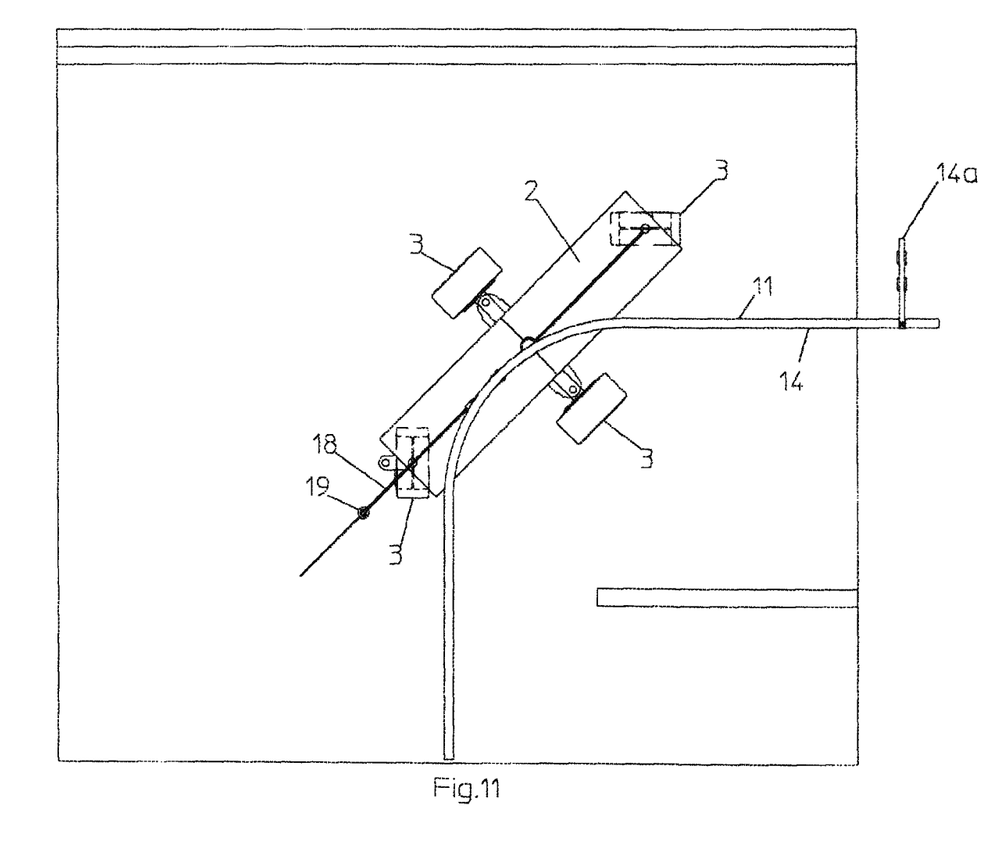
FIG. 11 shows a further embodiment of a feed wagon according to the present invention during cornering.

FIG. 11 shows the cornering of an elongate container 8 with an elongate chassis 2, the wheels being, however, arranged in the way shown in FIGS. 8 to 10. The distance between the two juxtaposed wheels defining a pair of wheels is, however, different from the distance between the leading and trailing wheels (the wheel distance transversely to the path of movement is smaller).

Figure 12:
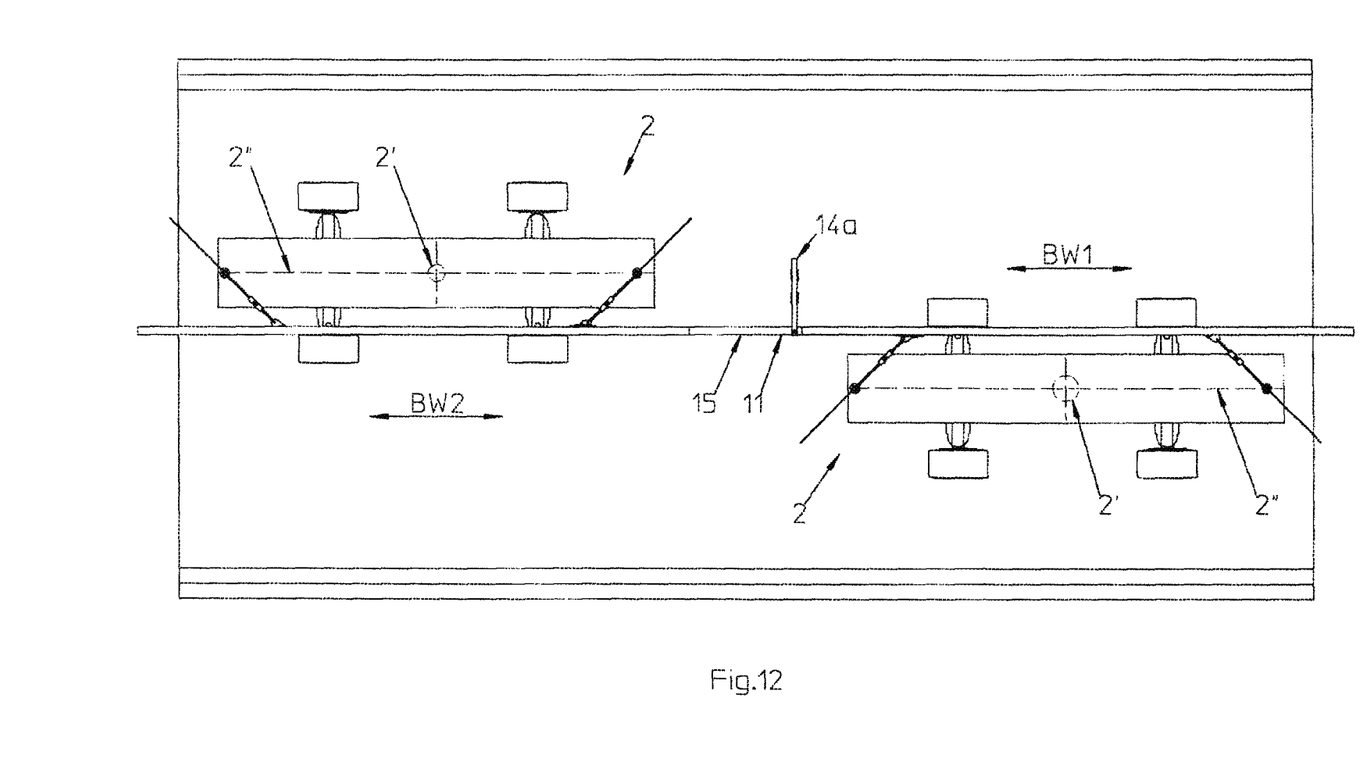
FIG. 12 shows a further operating mode of the feed wagon according to the present invention.

As can be seen in FIG. 12, two different angles of rotation α or angle-of-rotation ranges can be defined per chassis 2 (or feed wagon 1), said angles or angular ranges being displaced relative to one another by approximately 90°. This allows one and the same chassis 2 with a single carrier and preferably a single steering rail 15 and power rail 11, respectively, to be moved on two different paths of movement BW1 and BW2 parallel to one another. However, the principle of moving the chassis 2 with its vertical center line 2' below the carrier rail 14 must here be abandoned. On the contrary, the vertical center line 2' and the longitudinal center line 2" of the chassis 2 are here displaced in a horizontal direction relative to the carrier 14.

Figure 13:
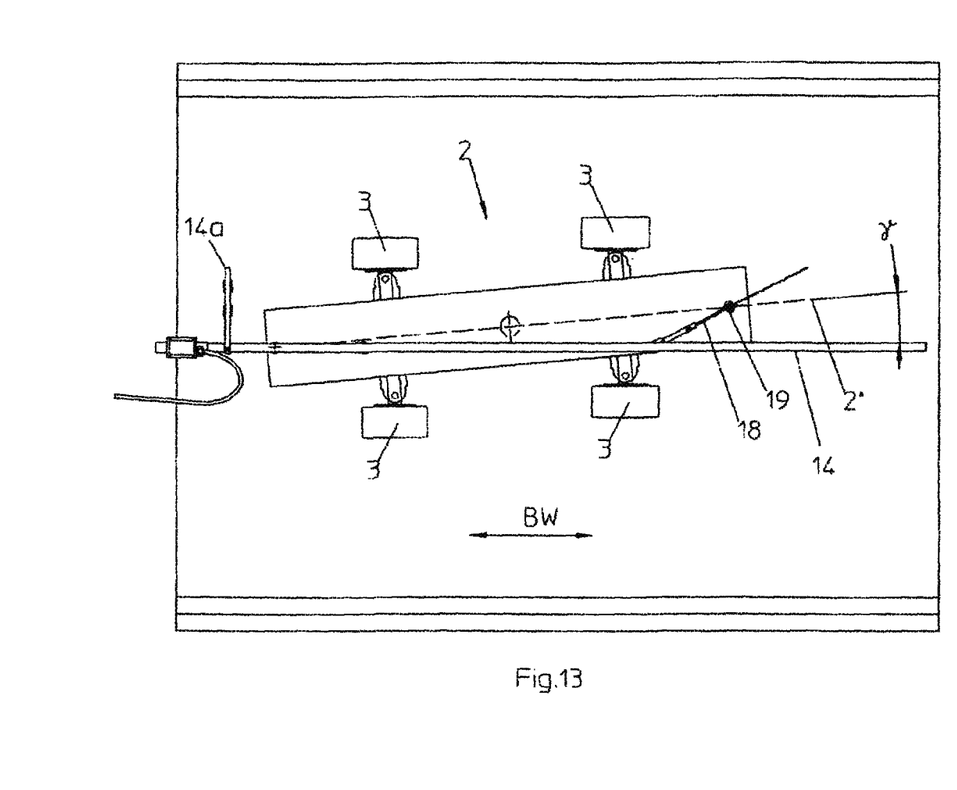
FIG. 13 shows a further operating mode (crab steering mode) of the feed wagon according to the present invention.

FIG. 13 shows that the invention can also be applied when the feed wagon 1 is operated in the so-called "crab steering mode", i.e. when the longitudinal center line 2" of its chassis 2 extends at an angle γ to the predetermined direction of movement BW. The feed wagon 1 is moved in this operating mode, if it should be necessary or desirable to position one of the feed wagon sides closer to the laterally positioned feed locations on the stable lane. Also for this operating mode an angle of rotation α or an angle-of-rotation range, which must be observed while the feed wagon 1 is moving, can be defined and stored.

As a modification of the above described and shown embodiments, details illustrated on the basis of the individual drawings may be exchanged for one another. For example, one steering arm or two respective steering arms or simple spiral springs may be used in each of the embodiments shown. Also the differently steered and configured chassis may be exchanged for one another.

In particular, it is also imaginable to use a three-wheeled chassis instead of a chassis having four wheels. The three wheels used may be two driving rear wheels located in one plane and a simple non-driven pivotable supporting wheel in the front. The two rear wheels may be adapted to be driven individually. Steering is then executed indirectly by driving these two wheels at different speeds. In the case of a chassis realized with only three wheels it would, however, also be possible to drive and steer only the front wheel and to realize the two rear wheels as simple idler wheels. It is, however, also imaginable to steer and drive each of the three wheels.

All known design principles can be used for the angle sensors. The feed wagon may also be provided with an on-board (emergency power) battery, so that it can also be moved without a rail. A battery or an internal combustion engine with a suitable dynamo or some other kind of power source would also be expedient as a temporary power supply, if the feed wagon has to be moved outside the area of the power rail, e.g. between spatially separated sites of use or for parking and the like.

The invention claimed is:

1. An unmanned feed wagon comprising a ground-supported chassis, a steering mechanism, an electric drive for driving the chassis (along a predetermined path of movement and a power supply for the electric drive,
   wherein the power supply comprises a power rail following the predetermined path of movement and having a sliding contact which is connected to the electric drive, and
   wherein the steering mechanism comprises a steering rail, which predetermines the path of movement and a sensing device for sensing the predetermined path of movement so as to steer the chassis, and wherein the sensing device includes a sensing head which follows the steering rail and wherein the sensing device comprises a steering arm which is pivotably connected to the sensing head and the chassis allowing a pivotal movement of the steering arm in a horizontal plane and a sensor unit monitoring an angle between the predetermined path of movement and the steering arm.

2. The unmanned feed wagon according to claim 1 wherein the steering rail and the power rail are arranged on a common carrier.

3. The unmanned feed wagon according to claim 1 wherein the power rail is arranged above the chassis.

4. The unmanned feed wagon according to claim 1 wherein the steering rail is arranged above the chassis.

5. The unmanned feed wagon according to claim 1 wherein the sensing device includes a sensing head in constant mechanical contact with the steering rail.

6. The unmanned feed wagon according to claim 1, wherein the sensor unit includes a sensor, which operates in a contact-free manner, for detecting a horizontal deviation of the chassis from the predetermined path of movement.

7. The unmanned feed wagon according to claim 1 wherein the sensor unit-includes an inclination sensor, which operates in a contact-free manner, for detecting a vertical deviation of the chassis from the predetermined path of movement.

8. The unmanned feed wagon according to claim 1, wherein the sensor unit-includes a magnetic sensor.

9. The unmanned feed wagon according to claim 1, wherein the sliding contact is arranged on a carriage which follows the power rail.

10. The unmanned feed wagon according to claim 9, wherein the carriage is configured as a sensing head of the sensing device.

11. The unmanned feed wagon according to claim 1, wherein the steering arm is dimensioned and arranged such that the sensing head is arranged substantially vertically above the longitudinal centre line of the chassis extending in the direction of the path of movement.

12. The unmanned feed wagon according to claim 1, wherein the steering arm comprises a means for compensating the length of a steering arm.

13. The unmanned feed wagon according to claim 1, wherein at least two sensing devices arranged in spaced relationship with one another along the predetermined path of movement are provided for the chassis.

14. The unmanned feed wagon according to claim 1, wherein the steering unit includes means for an emergency shutdown of the unmanned feed wagon.

15. The unmanned feed wagon according to claim 1, wherein the chassis comprises at least one steerable wheel connected to the steering mechanism via a signal processing unit.

16. The unmanned feed wagon according to claim 15, wherein the steering mechanism is configured such that the steering arm indicates the position of at least one steerable wheel.

17. The unmanned feed wagon according to claim 1, wherein the chassis comprises four steerable wheels connected to the steering mechanism via a signal processing unit.

18. The unmanned feed wagon according to claim 1, wherein the steering mechanism comprises a control unit.

19. The unmanned feed wagon according to claim 18, wherein the control unit is programmable.

20. The unmanned feed wagon according to claim 19, wherein the control unit is programmable for sideward movements transversely to the path of movement.

21. The unmanned feed wagon according to claim 18 wherein the chassis comprises wheels and wherein the speed of each wheel can be controlled independently.

22. The unmanned feed wagon according claim 21, wherein the chassis comprises two rear wheels and a front wheel, the two rear wheels being adapted to be driven with different speeds for the purpose of steering and the front wheel being a non-driven pivotable supporting wheel.

23. The unmanned feed wagon according to claim 1 which comprises a second, temporary power source.

24. The unmanned feed wagon according to claim 1 wherein the chassis comprises wheels and the electric drive comprises electric wheel motors for independently driving each of the wheels.

25. The unmanned feed wagon according to claim 1 wherein the sensing device mechanically senses the predetermined path of movement.

* * * * *